United States Patent
Li

(10) Patent No.: US 9,197,734 B2
(45) Date of Patent: Nov. 24, 2015

(54) APPARATUS AND METHOD FOR SHARING SCREENS FROM MULTIPLE MOBILE DEVICES

(71) Applicant: Samsung Electronics Co. Ltd., Suwon-si, Gyeonggi-do (KR)

(72) Inventor: Zhiyun Li, Kenmore, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 13/734,163

(22) Filed: Jan. 4, 2013

(65) Prior Publication Data

US 2014/0194066 A1  Jul. 10, 2014

(51) Int. Cl.
*H04B 7/00* (2006.01)
*H04M 1/725* (2006.01)
*G06F 3/14* (2006.01)

(52) U.S. Cl.
CPC ............ *H04M 1/7253* (2013.01); *G06F 3/1446* (2013.01); *G06F 3/1438* (2013.01); *G09G 2340/145* (2013.01); *H04M 2250/12* (2013.01); *H04M 2250/16* (2013.01)

(58) Field of Classification Search
CPC .......... H04M 1/0266; H04M 2250/16; H04M 1/7253; G06F 3/1438; G09G 2340/145
USPC .................... 455/41.3, 566, 550.1, 412.1, 413
See application file for complete search history.

(56) References Cited

U.S. PATENT DOCUMENTS

| | | | |
|---|---|---|---|
| 7,894,854 B2 * | 2/2011 | Lee ............................. | 455/556.1 |
| 7,894,860 B2 * | 2/2011 | Moon et al. .................. | 455/566 |
| 8,660,492 B2 * | 2/2014 | Hong et al. .................. | 455/41.2 |
| 8,682,248 B2 * | 3/2014 | Jeon et al. .................... | 455/41.2 |
| 8,774,715 B2 * | 7/2014 | Kwon et al. ................. | 455/41.1 |
| 8,838,135 B2 * | 9/2014 | Moshfeghi ................. | 455/456.1 |
| 2013/0065648 A1 * | 3/2013 | Kim et al. ..................... | 455/566 |
| 2013/0090101 A1 * | 4/2013 | Park et al. .................. | 455/414.3 |
| 2013/0132477 A1 * | 5/2013 | Bosworth et al. ............ | 709/204 |
| 2013/0138728 A1 * | 5/2013 | Kim et al. ..................... | 709/203 |
| 2014/0007080 A1 * | 1/2014 | Lieb ............................ | 717/176 |
| 2014/0073300 A1 * | 3/2014 | Leeder et al. ................ | 455/416 |
| 2014/0155031 A1 * | 6/2014 | Lee et al. .................... | 455/411 |

* cited by examiner

*Primary Examiner* — Marceau Milord
(74) *Attorney, Agent, or Firm* — Jefferson IP Law, LLP

(57) ABSTRACT

An apparatus and method for sharing screens among multiple mobile devices are provided. The mobile device includes a sensor, a communication unit for determining whether at least one other mobile device is substantially in contact with the mobile device, based on information received from the sensor, and for communicating with the at least one other mobile device, a display unit including a physical screen for displaying a graphical component, and a controller for combining the physical screen of the display unit with physical screens of the at least one other mobile device into a single logical screen such that graphical components displayed on one physical screen may be moved to another physical screen as if both physical screens were part of a single screen.

16 Claims, 3 Drawing Sheets

APPARATUS AND METHOD FOR SHARING SCREENS FROM MULTIPLE MOBILE DEVICES

BACKGROUND OF THE INVENTION

1. Field of the Invention

The present invention relates to an apparatus and method for screen sharing. More particularly, the present invention relates to an apparatus and method for sharing screens from multiple mobile devices.

2. Description of the Related Art

Mobile terminals are developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), E-mail, games, remote control of short range communication, an image capturing function using a mounted digital camera, a multimedia function for providing audio and video content, a scheduling function, and many more. With the plurality of features now provided, a mobile terminal has effectively become a necessity of daily life.

Mobile devices also provide a variety of sharing features, which allow users to share data on their mobile devices with other users. For example, a user may take a picture using a mobile device equipped with a camera, and share the image with other users. This sharing is typically accomplished through a wireless communication technology such as Near Field Communications (NFC), Bluetooth, Wi-Fi, or infrared communication.

However, mobile devices do not support sharing between monitors or screens, in which screens of two different mobile devices are treated as a single screen, allowing the user to move interface items displayed on one screen to the other. Desktop and laptop computers support a multi-monitor operation in which multiple monitors are tiled together and act as a single screen. However, these desktop arrangements typically involve a single system controlling multiple monitors.

Mobile device design is trending toward a multiple window system, similar to desktop and laptop computers, in which a display environment includes multiple windows and other graphical components. In view of this trend, there is a need for a method and system to enable sharing of interface items among screens of multiple mobile devices.

SUMMARY OF THE INVENTION

Aspects of the present invention are to address at least the above-mentioned problems and/or disadvantages and to provide at least the advantages described below. Accordingly, an aspect of the present invention is to provide an apparatus and method for sharing screens from multiple mobile devices.

In accordance with an aspect of the present invention, a mobile device provided. The mobile device includes a sensor, a communication unit for determining whether at least one other mobile device is substantially in contact with the mobile device, based on information received from the sensor, and for communicating with the at least one other mobile device, a display unit including a physical screen for displaying a graphical component, and a controller for combining the physical screen of the display unit with physical screens of the at least one other mobile device into a single logical screen such that graphical components displayed on one physical screen may be moved to another physical screen as if both physical screens were part of a single screen.

In accordance with another aspect of the present invention, a method for sharing screens of multiple mobile devices is provided. The method includes rendering, by a first mobile device, a graphical component on a first physical screen of the first mobile device, determining whether a second mobile device contacts the first mobile device, and when the second mobile device contacts the first mobile device, tiling and combining the first physical screen with a second physical screen of the second mobile device to create a logical screen.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for enabling screen sharing among multiple mobile devices.

Figure 1:
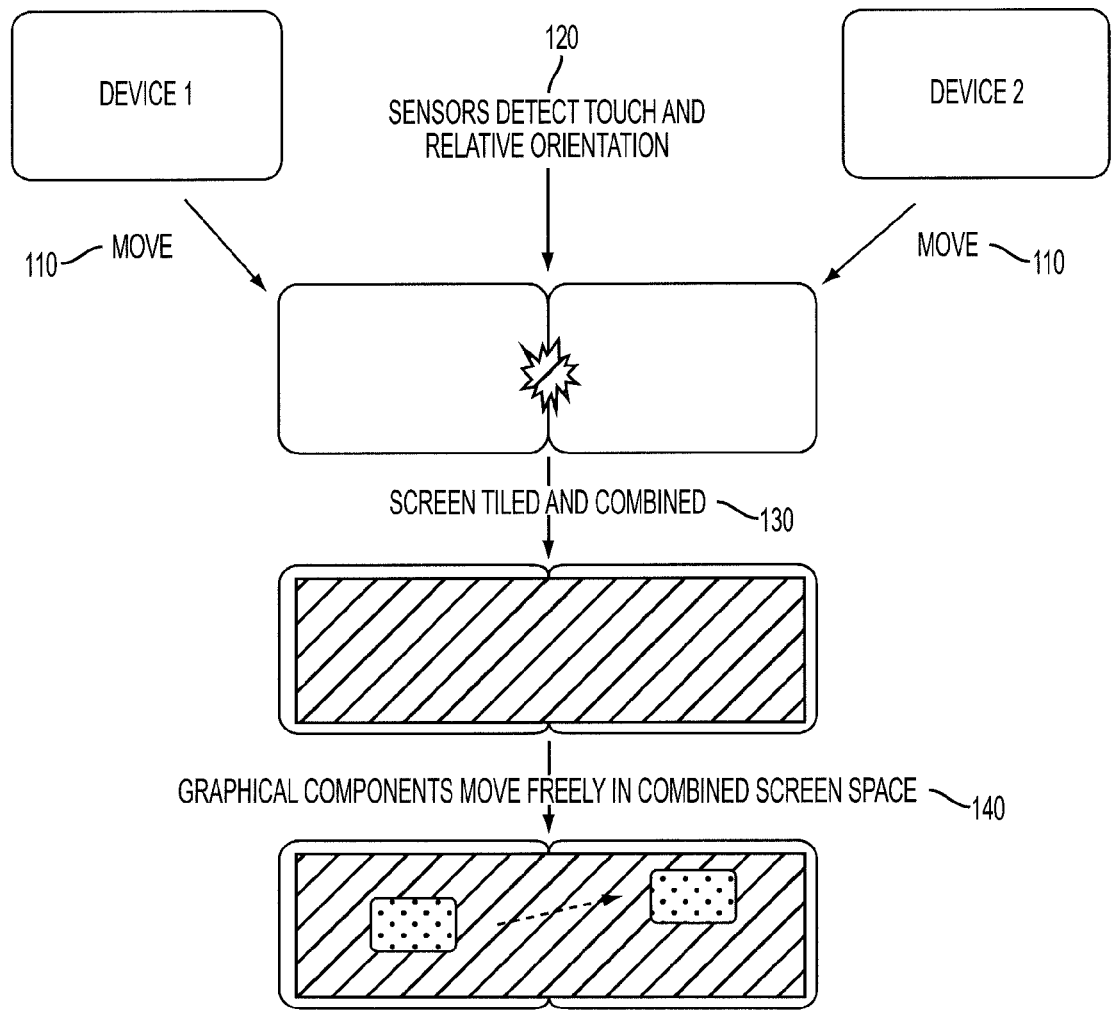
FIG. 1 illustrates a method of sharing according to an exemplary embodiment of the present invention.

FIG. 1 illustrates a method of sharing according to an exemplary embodiment of the present invention.

Referring to FIG. 1, two mobile devices, Device 1 and Device 2, are brought into contact with each other in step 110. The mobile device may include any device having a physical screen, such as tablets, mobile phones, and the like. According to an exemplary embodiment of the present invention, Device 1 and Device 2 may support the same operating system, such as Android™. However, Device 1 and Device 2 may support different operating systems; in this case, the functionality of the screen sharing may be incorporated in an application (app) executing in both Device 1 and Device 2.

Figure 2A:
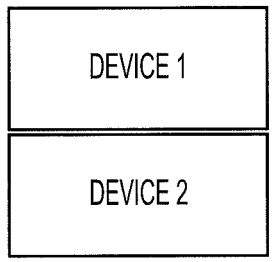
FIGS. 2A-2D illustrate different arrangements of mobile devices according to an exemplary embodiment of the present invention.

One or more sensors incorporated within the mobile devices detect the contact between the mobile devices in step 120. The sensors may be outfitted with passive or active detection. The sensors need not be incorporated in both of the mobile devices. The sensors may be incorporated in only one of the mobile devices. In addition to detecting the contact, the sensors may also detect the orientation of the devices (e.g., whether the devices contact horizontally as shown in FIG. 1, or vertically as shown in FIG. 2A) and the alignment of the devices. Detecting the alignment of the devices may be especially useful if the devices do not have the same size. The sensors detect the contact and alignment of the devices and communicate this information to the devices to enable the creation of a single logical screen.

In step 130, the physical screens of the mobile devices are tiled and combined into a single logical screen. Thus, while the two screens remain physically separate, both Device 1 and Device 2 treat the screens as a single screen. The same screen is therefore shared between both devices. To tile and combine the two physical screens, Device 1 and Device 2 may communicate with each other via a wireless communication system. According to an exemplary embodiment of the present invention, a short-range communication system, such as Near Field Communication, Bluetooth, or infrared communication may be used to exchange data between the devices and arrange the combination of the two physical screens into a single logical screen. However, any communication system (wired or wireless) may be employed for this purpose.

When the devices are tiled and combined, the devices may set up a communication channel between them using the communication system. This communication channel may be used to transmit information needed to render the graphical components on the logical screen.

The shared screen setup allows graphical components displayed on the screens of the mobile devices to move within the logical screen in step 140. Graphical components may include windows, icons, widgets, menus, and the like.

While both Device 1 and Device 2 treat the logical screen as a single screen, the respective devices may nevertheless control the display of graphical components on their respective physical screens. For example, a window shown on the screen of Device 1 would be rendered and controlled by Device 1, while an icon shown on the physical screen of Device 2 would be rendered and controlled by Device 2.

However, in some cases, a graphical component displayed on the physical screen of Device 1 may nevertheless be controlled by Device 2, and vice versa. For example, Device 1 and Device 2 may operate in a master/slave relationship, in which one device is the master device that controls operations for both devices. If Device 1 is the master device, then Device 1 will control operations related to the logical screen, and Device 2 may only be responsible for rendering graphical components on the physical screen of Device 2 under the control of Device 1.

As described above, the devices may share the control over the logical screen, such as by dividing up control of various graphical components according to the physical screen on which each graphical component is being displayed. Even in this scenario, both devices may retain information about graphical components displayed on the other. This information may be updated whenever the user moves a graphical component, or may be updated periodically. In addition, when the user moves a graphical component from one screen to the other, information about the graphical component may be transferred to the other device to assist the other device in rendering the graphical component.

The logical screen may be used to facilitate sharing of data between the two devices. When a graphical component is moved from one physical screen to the other, data associated with that graphical component may also be transferred. For example, if a user moves an icon representing a file from the physical screen of Device 1 to the physical screen of Device 2, the file itself may be copied to Device 2 to correspond with the movement of the icon from the physical screen of Device 1 to the physical screen of Device 2.

Since the two physical screens are combined as a single logical screen, the user may employ a variety of gestures to move icons, windows, and other graphical components around the logical screen. For example, the user may touch a window displayed on the physical screen of Device 1 and drag the window to the physical screen of Device 2. As the user drags the window, the window would appear entirely on the physical screen of Device 1, then appear partially on both physical screens, and finally appear entirely on the physical screen. An associated data transfer may be initiated when the window appears entirely on the physical screen of Device 2.

Other touch gestures may also be used to move windows and other graphical components around the logical screen. For example, multi-touch and pinch gestures may be used in the same manner as single-device screens, even when a graphical component straddles multiple physical screens. Similarly, the user may "throw" a graphical component across the logical screen from one physical screen to the other by touching the graphical component, making a quick drag motion in the direction of another physical screen, and then releasing the touch. This may result in the graphical component moving, as if thrown, to a position on the corresponding physical screen. This position may be a predetermined position or a position determined according to a velocity or acceleration of the user's touch movement.

When a graphical object moves from one device to another, such as from Device 1 to Device 2 as shown in FIG. 1, Device 1 transmits information about the graphical component to Device 2 via the communication channel set up in step 130. This information may include information needed to render the entire graphical component, as well as information about a portion of the graphical component to be displayed on the physical screen of Device 2. As the graphical component moves from Device 1 to Device 2, more and more of the graphical component may be displayed on Device 2, until the entire graphical component is displayed on Device 2.

Further operation of the logical screen with respect to the graphical component may depend on whether Device 1 retains control over the graphical component or whether Device 2 has control over the graphical component. If Device 2 has control over the graphical component, Device 1 transmits a context of the object to Device 2, to enable Device 2 to control the graphical component. This context may be a memory dump of the runtime status of the graphical component. Alternatively, if the graphical component has a well-defined state (such as e.g., a window for editing a text file), Device 2 may merely sync the data (text data) with Device 1.

If Device 1 retains control over the graphical component, Device 2 transmits any information about the user's interaction with the graphical component to Device 1 over the communication channel. Device 1 then updates its context to incorporate the changes due to the user's interaction and transmits appropriate information back to Device 2 to enable Device 2 to render the graphical component according to the user's interaction.

Alternatively, Device 1 and Device 2 may share a memory space including a context of the graphical component, update the context according to the user's interaction, and render the graphical component according to the updated context. In this case, the memory may be shared across the devices, or may be shared in another memory space, such as a server or cloud storage.

FIG. 1 shows an arrangement of two devices arranged side-by-side in a horizontal manner. However, this is only one possible arrangement. Several other exemplary arrangements are described below with respect to FIGS. 2A-2D.

FIGS. 2A-2D illustrate different arrangements of mobile devices according to an exemplary embodiment of the present invention.

Referring to FIGS. 2A-2D, any number of devices may be combined to form a single logical screen, and a variety of arrangements are possible. FIG. 2A shows an example in which two devices are arranged vertically. This arrangement may be suitable for displaying a full-size keyboard on the physical screen of the lower device and enabling input of characters displayed on the physical screen of the upper device.

Figure 2B:
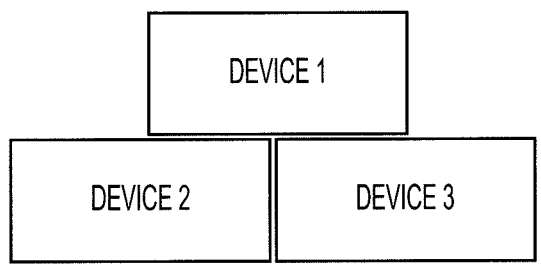
Figure 2C:
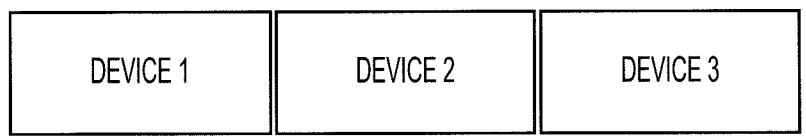

FIGS. 2B and 2C show examples of more than two devices combining to form a single logical screen. In FIG. 2B, three devices are shown in a pyramid arrangement, while in FIG. 2C, the three devices are shown arranged side-by-side. Arrangements of more than three devices are also possible.

Figure 2D:
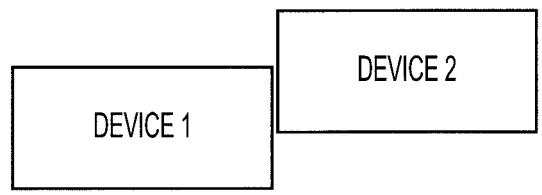

The screens of the mobile devices need not be perfectly aligned. FIG. 2D shows an example in which the screens of Device 1 and Device 2 are not perfectly aligned. According to some exemplary embodiments, the tiling and combining may not occur until the screens of the devices are substantially aligned with one another, such as the arrangements shown in FIG. 1 and FIGS. 2A and 2C. According to other exemplary embodiments, the physical screens may be combined even when they do not align with each other, such as the examples shown in FIGS. 2B and 2D.

Where the physical screens do not align, such as in the arrangement shown in FIG. 2B, the physical screens may be tiled and combined in such a way that the logical screen has an irregular shape. The physical screens may also be tiled and combined in such a way that the logical screen maintains a rectangular arrangement. In this case, a mapping may occur when moving a graphical component from one screen to another. For example, in the arrangement shown in FIG. 2B, the entire top edge of Device 1 may be mapped to the left half of Device 3's bottom edge.

Although FIG. 1 and FIGS. 2A-2D show mobile devices of the same size, it is understood that the mobile devices may have different sizes or types. For example, Device 1 may be a tablet with a relatively large form factor, while Device 2 may be a tablet with a smaller form factor. Similarly, Device 1 may be a tablet and Device 2 may be a mobile phone (e.g., smartphone).

The functionality for facilitating screen sharing according to exemplary embodiments of the present invention may be incorporated into an operating system of the mobile devices, such as the Android™ operating system developed by Google, Inc. The functionality may also be incorporated into a separate application. In this case, applications may be developed for different operating systems to allow screen sharing across devices having different operating systems.

Figure 3:
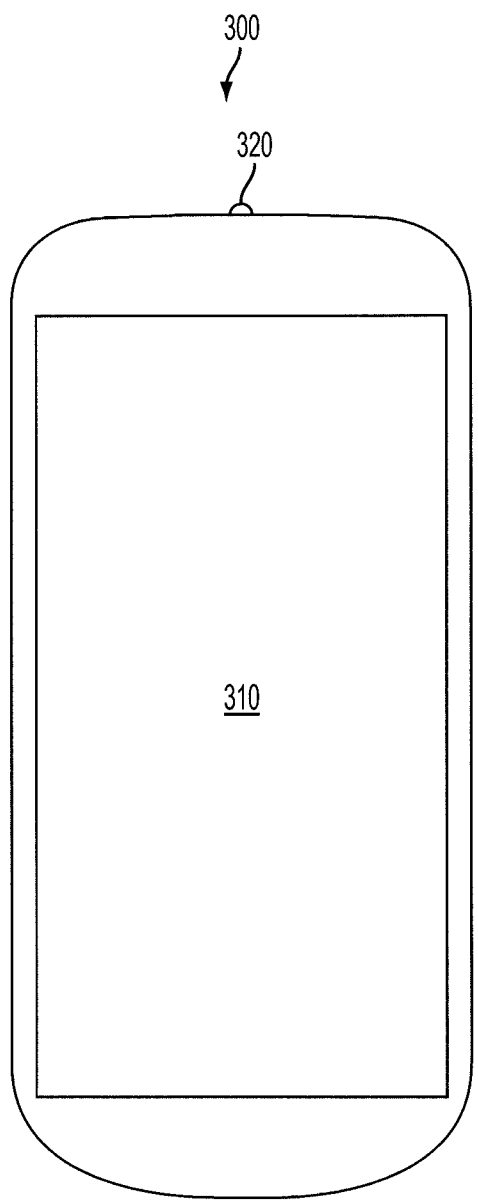
FIG. 3 illustrates a mobile device according to exemplary embodiments of the present invention.

FIG. 3 illustrates a mobile device according to exemplary embodiments of the present invention.

Referring to FIG. 3, the mobile device 300 includes a screen 310 and a sensor 320. In addition, the mobile device 300 may also include a controller and a communication unit. The controller is disposed within the mobile device 300 and is thus not shown in FIG. 3; similarly, the communication unit may be disposed entirely or partially within the mobile device 300 (the communication unit may include an antenna arranged on the exterior of the mobile device 300) and is also not shown in FIG. 3. The mobile device 300 may also include additional units not shown, which may vary according to the function of the mobile device 300. Such additional units may include a storage unit, a camera, a Global Position System (GPS) or other location services unit, a speaker, a microphone, an input unit, and the like.

The display unit 310 represents a physical screen of the mobile device 300, and displays graphical components, including windows, icons, menus, other user interface elements, and various content. The display unit 320 may be implemented as a touch screen. When the controller determines that another device is in contact with the mobile device 300, the controller controls the physical screen of the display unit 310 to act as a portion of a logical screen. Accordingly, the user may move graphical components displayed on the physical screen of the display unit 320 among and between the physical screens of the other mobile device(s) as if the graphical components were on the same screen. While the display unit 310 is described herein as a touch screen, it should be understood that exemplary embodiments of the present invention are not limited thereto.

The sensor unit 320 detects the approach and alignment of other devices and provides this information to the controller. The sensor 320 may be any type of sensor that is capable of detecting contact or proximity, and may be an inductive type, capacitive type, optical type, ultrasonic type, magnetic type, and the like. While only one sensor 320 is shown on the mobile device 300, multiple sensors 320 may be deployed, and may be arranged on two or more sides of the mobile device. The sensors may be arranged in a dense manner or in a sparse manner. A sparse array of sensors may be used to detect a limited number of predetermined alignments, while a denser array may be able to detect a larger range of alignments.

According to another exemplary embodiment of the present invention, the sensor 320 may be replaced or supplemented by a group of pins arranged on some or all sides of the device. When these pins come into contact with corresponding pins in the other mobile device, a communication circuit is completed that enables the two devices to communicate data regarding the logical screen. This communication may supplement or replace communication via the communication unit. In this exemplary embodiment, the pins may be supplemented with magnets to facilitate proper alignment between the mobile device 300 and the other mobile device.

The controller controls the overall operations of the mobile device 300. The controller determines whether another device is in contact with the mobile device 300, based on the information provided by the sensor 320. When the controller determines that another device is in contact with the mobile device, the controller determines the side (or portion of a side) that is contacting the other device, and cooperates with the other device (via the communication unit) to tile and combine the physical screens into a single logical screen.

While the logical screen is active and the mobile device 300 is contacting the other device, the controller may be responsible for displaying any graphical components to be displayed on the physical screen of the display unit 310. When a graphical component moves to the physical screen of the other device, the controller may communicate information needed to render the graphical component, as well as other related information, to the other device via the communication unit. Similarly, when the graphical component moves to the physical screen of the mobile device 300, the controller may receive information needed to render the graphical component via the display unit 310, as well as other related information.

The communication unit may communicate with the other devices using any short-range communication system. Exemplary systems include NFC, Bluetooth, and infrared communication. In addition, according to the functionality of the mobile device 300, the communication unit may also be equipped to communicate using other wired or wireless communication systems.

Exemplary embodiments of the present invention may have a variety of applications. Two such applications, file transfer and virtual keyboard, have been described above. However, exemplary embodiments may also be applied to games and social applications. For example, tiling and combining two physical screens into one logical screen may open up new methods of gameplay and multiplayer options. Other applications are also possible, including multitasking (e.g., showing multiple windows on the same screen, displaying data from one or more devices) or document viewing (e.g., showing one document on one physical screen and another document on another physical screen). Other applications are, of course, also possible, and it is to be understood that exemplary embodiments of the present invention are not limited to these applications.

While it has been described above that the devices come into contact with each other, the devices need not come into physical contact with each other. For example, the devices could be separated by a distance of up to several millimeters. Such a distance would be close enough for the user to perceive the physical screens as a single logical screen and to allow the user to manipulate both physical screens easily. In addition, relaxing the requirement for physical contact will assist children and users with limited dexterity, for whom it might be difficult to arrange the devices appropriately.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile device comprising:
    a sensor;
    a communication unit for determining whether at least one other mobile device is in physical contact with the mobile device along at least a portion of an edge of the mobile device, based on information received from the sensor, and for communicating with the at least one other mobile device;
    a display unit including a physical screen for displaying a graphical component; and
    a controller for combining the physical screen of the display unit with physical screens of the at least one other mobile device into a single logical screen such that graphical components displayed on one physical screen may be moved to another physical screen as if both physical screens were part of a single screen.

2. The mobile device of claim 1, wherein the controller controls the display unit to render each graphical component displayed on the physical screen of the display unit.

3. The mobile device of claim 2, wherein, when a graphical component is moved from the physical screen of the display unit to a physical screen of one of the at least one other mobile devices, the controller controls the communication unit to transmit information for rendering the graphical component to the corresponding at least one other mobile device.

4. The mobile device of claim 2, wherein, when a graphical component is moved from the physical screen of the display unit to physical screen of one of the at least one other mobile devices, the controller controls the communication unit to transmit information related to the graphical component to the corresponding at least one other mobile device.

5. The mobile device of claim 1, wherein the display unit includes a touch screen.

6. The mobile device of claim 1, wherein the sensor comprises a plurality of sensors arranged on at least two sides of the mobile device.

7. The mobile device of claim 1, wherein the controller controls the display unit to transmit information to the at least one other mobile device, the information relating to user interaction with the graphical component.

8. The mobile device of claim 1, wherein the receiver receives information about a second graphical component to be displayed by the display unit, and the controller controls the display unit to display the second graphical component according to the received information.

9. The mobile device of claim 1, wherein the sensor determines whether the mobile device is substantially in contact with at least one other mobile device, and determines at least one of an orientation and alignment of the at least one other mobile device.

10. The mobile device of claim 1, wherein the sensor comprises a group of pins connectable to a corresponding group of pins in the at least one other mobile device such that a communication channel is created between the mobile device and the at least one other mobile device when the group of pins contacts the corresponding group of pins.

11. A method for sharing screens of multiple mobile devices, the method comprising:
    rendering, by a first mobile device, a graphical component on a first physical screen of the first mobile device;
    determining whether a second mobile device in is physical contact with the first mobile device along at least a portion of an edge of the mobile device; and
    when the second mobile device is in physical contact with the first mobile device, tiling and combining the first physical screen with a second physical screen of the second mobile device to create a logical screen.

12. The method of claim 11, further comprising:
    receiving a user input to move the graphical component from the first physical screen to the second physical screen; and
    rendering, by the second mobile device, the graphical component on the second physical screen.

13. The method of claim 12, further comprising:
    transmitting information to the second mobile device so as to allow the second mobile device to render the graphical component on the second physical screen.

14. The method of claim 12, further comprising:
transmitting information related to the graphical component to the second mobile device.

15. The method of claim 11, further comprising:
receiving, at the first mobile device from the second mobile device, information on a second graphical component; and
rendering, by the first mobile device, the second graphical component on the first physical screen based on the received information.

16. The method of claim 11, further comprising:
receiving, by the first mobile device, information about user interaction with a graphical component displayed on the first physical screen; and
transmitting, from the first mobile device to the second mobile device, the information about the user interaction.

\* \* \* \* \*